US010677702B2

(12) United States Patent
Fukui

(10) Patent No.: US 10,677,702 B2
(45) Date of Patent: Jun. 9, 2020

(54) METHOD OF PREDICTING FORMED BODY DENSITY AND METHOD OF MANUFACTURING CERAMIC FIRED BODY

(71) Applicant: NGK INSULATORS, LTD., Nagoya (JP)

(72) Inventor: Toshihiro Fukui, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 299 days.

(21) Appl. No.: 15/461,836

(22) Filed: Mar. 17, 2017

(65) Prior Publication Data

US 2017/0284917 A1 Oct. 5, 2017

(30) Foreign Application Priority Data

Mar. 29, 2016 (JP) .................... 2016-066880

(51) Int. Cl.
*G01N 9/00* (2006.01)
*G01N 9/02* (2006.01)
(Continued)

(52) U.S. Cl.
CPC ............... *G01N 9/00* (2013.01); *B28B 3/20* (2013.01); *B28B 3/26* (2013.01); *B28B 17/0072* (2013.01);
(Continued)

(58) Field of Classification Search
CPC .......... G01N 9/00; G01N 15/088; B28B 3/26; B28B 21/52; B28B 17/0072
See application file for complete search history.

(56) References Cited

U.S. PATENT DOCUMENTS 4,056,714 A * 11/1977 Al-Shaikh ............ D21G 9/0027
162/198
4,632,683 A * 12/1986 Fukutani ............ B01D 39/2075
156/89.25
(Continued)

FOREIGN PATENT DOCUMENTS

JP H11-326174 A1 11/1999
JP 2004-131377 A1 4/2004
(Continued)

OTHER PUBLICATIONS

Japanese Office Action (Application No. 2016-066880) dated Dec. 11, 2018 (with English translation).
(Continued)

*Primary Examiner* — Nathan H Empie
(74) *Attorney, Agent, or Firm* — Burr & Brown, PLLC

(57) ABSTRACT

The method of predicting a formed body density includes: a correlation calculating step of obtaining the correlation between the formed body density of the formed body and the porosity of the fired body; and a formed body density predicting step including: in a case of preparing a kneaded material A from a ceramic raw material having substantially the same composition as a ceramic raw material used for preparing a kneaded material, preparing a formed body B by forming the kneaded material A, preparing a dried body C by drying the formed body B, and preparing a fired body D having a desired porosity by firing the dried body C, calculating a predicted value of the formed body density of the formed body B corresponding to the desired porosity of the fired body D using the correlation.

4 Claims, 4 Drawing Sheets

(51) Int. Cl.
*B28B 3/20* (2006.01)
*B28B 3/26* (2006.01)
*B28B 17/00* (2006.01)
*B28B 21/52* (2006.01)
*C04B 38/06* (2006.01)
*G01N 15/08* (2006.01)
*C04B 111/00* (2006.01)

(52) U.S. Cl.
CPC .......... *B28B 21/52* (2013.01); *C04B 38/0645* (2013.01); *G01N 9/02* (2013.01); *G01N 15/088* (2013.01); *C04B 2111/00793* (2013.01); *G01N 2009/022* (2013.01)

(56) References Cited

U.S. PATENT DOCUMENTS

| | | |
|---|---|---|
| 2005/0217395 A1 | 10/2005 | Iwabuchi et al. |
| 2006/0257620 A1 | 11/2006 | Noguchi et al. |
| 2008/0022644 A1* | 1/2008 | DeRosa ................ C04B 35/195 55/523 |
| 2009/0291837 A1* | 11/2009 | Ohno ................ B01D 53/9431 502/71 |

FOREIGN PATENT DOCUMENTS

| | | |
|---|---|---|
| JP | 2005-315861 A1 | 11/2005 |
| JP | 2008-115047 A1 | 5/2008 |
| JP | 2009-061683 A1 | 3/2009 |
| JP | 2012-213890 A1 | 11/2012 |
| WO | 2005/018893 A1 | 3/2005 |

OTHER PUBLICATIONS

Japanese Office Action (Application No. 2016-066880) dated Jul. 24, 2018 (with English translation).

* cited by examiner

METHOD OF PREDICTING FORMED BODY DENSITY AND METHOD OF MANUFACTURING CERAMIC FIRED BODY

"The present application is an application based on JP-2016-066880 filed on Mar. 29, 2016 with Japan Patent Office, the entire contents of which are incorporated herein by reference."

BACKGROUND OF THE INVENTION

Field of the Invention

The present invention relates to a method of predicting a formed body density and a method of manufacturing a ceramic fired body.

Description of the Related Art

Conventionally, a ceramic fired body is configured as, for example, a honeycomb structure having a honeycomb shape, and is used for a wide range of applications such as a catalyst carrier for purifying automobile exhaust gas, a diesel particulate removal filter, or a heat storage body for a combustion device. The ceramic fired body is manufactured in such a manner that a forming raw material is extruded to produce a ceramic formed body, which then undergoes a firing step of firing the formed body at a high temperature. A honeycomb structure, which is one of the ceramic fired bodies, has polygonal lattice-like partition walls that define a plurality of cells becoming through channels for fluid and extending from one end face to the other end face.

A forming step of extruding a ceramic formed body into a desired shape is performed using an extruder, in which an extrusion die (die) having a desired shape is attached to an extrusion port. In the forming step, a forming raw material is extruded from the extrusion die at a predetermined extrusion pressure and a predetermined extrusion speed in a state where the extrusion direction is made to coincide with the horizontal direction.

Various kinds of ceramic raw materials, pore formers, binders and the like are used as the forming raw material, and they are mainly powder or in a powdery form. Therefore, in order to allow extrusion from the extruder, liquid such as water and/or surfactant is added in a mixing step of mixing the ceramic raw material and the like. In the mixing step, by using a batch type mixing apparatus (batch mixer), first, two or more kinds of aggregate particle raw materials such as the above-mentioned ceramic raw material, weighed based on a predetermined mixing ratio, are subjected to dry mixing (first mixing), and further subjected to wet mixing (second mixing) in which liquid (water) is added, thereby obtaining a wet mixture (forming compound) (see Patent Document 1). Thereafter, through a kneading step of kneading the wet mixture (forming mixture) subjected to the wet mixing, a forming raw material adjusted to have a predetermined viscosity suitable for extrusion is extruded from the extruder.

[Patent Document 1] WO 2005/018893 A

SUMMARY OF THE INVENTION

In the conventional method of manufacturing a honeycomb formed body, the porosity of a honeycomb fired body is adjusted by changing the amount of a pore former added at the time of wet mixing. In the case of changing the addition amount of the pore former, however, if the measured porosity of the honeycomb fired body is not a desired porosity, it is necessary to manufacture a honeycomb formed body again from the initial dry mixing.

Therefore, the present invention has been made in view of the above circumstances, and provides a method of predicting a formed body density and a method of manufacturing a ceramic fired body using the method of predicting a formed body density, the methods allowing manufacturing a honeycomb fired body having a desired porosity.

In order to solve the above problems, according to the present invention, a method of predicting a formed body density and a method of manufacturing a ceramic fired body as described below are provided.

According to a first aspect of the present invention, a method of predicting a formed body density is provided, including: a correlation calculating step including: preparing a kneaded material by kneading a ceramic raw material containing inorganic powder, a binder, a pore former, and water; preparing a formed body by forming the kneaded material; measuring a formed body density of the formed body; further preparing a dried body by drying the formed body; preparing a fired body by firing the dried body; measuring a porosity of the fired body; and obtaining a correlation between the formed body density of the formed body and the porosity of the fired body; and a formed body density predicting step including: in a case of preparing a kneaded material A from a ceramic raw material having substantially the same composition as the ceramic raw material used for preparing the kneaded material, preparing a formed body B by forming the kneaded material A, preparing a dried body C by drying the formed body B, and further preparing a fired body D having a desired porosity by firing the dried body C, calculating a predicted value of the formed body density of the formed body B corresponding to the desired porosity of the fired body D using the correlation.

According to a second aspect of the present invention, the method of predicting a formed body density according to above first aspect is provided, wherein the correlation is obtained by approximating the correlation to a linear function [porosity of fired body=coefficient A×(formed body density)+coefficient B].

According to a third aspect of the present invention, the method of predicting a formed body density according to above first or second aspects is provided, wherein the pore former contains a foamable resin which is destroyed by being kneaded with the water.

According to a fourth aspect of the present invention method of manufacturing a ceramic fired body for preparing the fired body D having the desired porosity from the kneaded material A using the method of predicting a formed body density according to any one of above first to third aspects is provided, the method of manufacturing a ceramic fired body including: a kneaded material preparing step of preparing the kneaded material A by kneading a ceramic raw material containing inorganic powder, a binder, a pore former, and water; a forming step of forming the formed body B by extruding the kneaded material A; a firing step of preparing the fired body D by firing the formed body B; and a water addition amount adjusting step of adjusting an amount of water contained in the kneaded material A in order to obtain the predicted value of the formed body density of the formed body B.

According to a fifth aspect of the present invention, the method of manufacturing a ceramic fired body according to above fourth aspect is provided, further including: a formed body density measuring step of measuring the formed body density of the formed body B; and a porosity predicting step of predicting the porosity of the fired body D based on the correlation, using the formed body density measured in the formed body density measuring step, wherein in a case where the porosity predicted in the porosity predicting step is different from the desired porosity, the amount of water is adjusted in the water addition amount adjusting step.

According to a sixth aspect of the present invention, the method of manufacturing a ceramic fired body according to above fourth or fifth aspects is provided, wherein the kneaded material preparing step includes: a dry mixing step of performing dry mixing, through batch treatment, on a raw material including the inorganic powder, the binder, and the pore former among the ceramic raw material; a wet mixing step of performing wet mixing on a dry mixture obtained in the dry mixing step by adding liquid containing the water to the dry mixture; and a kneading step of kneading a wet mixture obtained in the wet mixing step, and the water addition amount adjusting step includes adjusting a water addition amount by adding the water to the kneaded material A in a process of kneading the wet mixture in the kneading step.

The method of predicting a formed body density according to the present invention includes a correlation calculating step of obtaining a correlation between a formed body density of a formed body and a porosity of a fired body, and a formed body density predicting step of calculating a predicted value of the formed body density of the formed body corresponding to a desired porosity of the fired body using the correlation. Therefore, by preparing a honeycomb formed body corresponding to the predicted formed body density, it is possible to prepare a honeycomb fired body having a desired porosity. In addition, it is possible to check the formed body density of the honeycomb formed body before firing and to adjust a ceramic raw material so as to obtain the formed body density corresponding to the desired porosity, even without preparing a honeycomb fired body by firing the extruded honeycomb formed body and checking the porosity of the honeycomb fired body.

In addition, the method of manufacturing a ceramic fired body using the above-described method of predicting a formed body density includes a kneaded material preparing step of preparing a kneaded material A by kneading a ceramic raw material containing inorganic powder, a binder, a pore former, and water, a forming step of forming a formed body B by extruding the kneaded material A, and a firing step of preparing a fired body D by firing the formed body B. The method further includes a water addition amount adjusting step of adjusting the amount of water contained in the kneaded material A so as to obtain a predicted value of the formed body density of the formed body B. Therefore, it is possible to prepare a honeycomb formed body corresponding to a honeycomb fired body having a desired porosity, without firing the honeycomb formed body to check the porosity. Furthermore, in the water addition amount adjusting step, it is possible to finely adjust the formed body density of the ceramic formed body at a stage before the extrusion.

DESCRIPTION OF THE PREFERRED EMBODIMENTS

Hereinbelow, embodiments of the present invention will be described with reference to the drawings. The present invention is not limited to the following embodiments, and changes, modifications and improvements may be added without departing from the scope of the invention.

Figure 1:
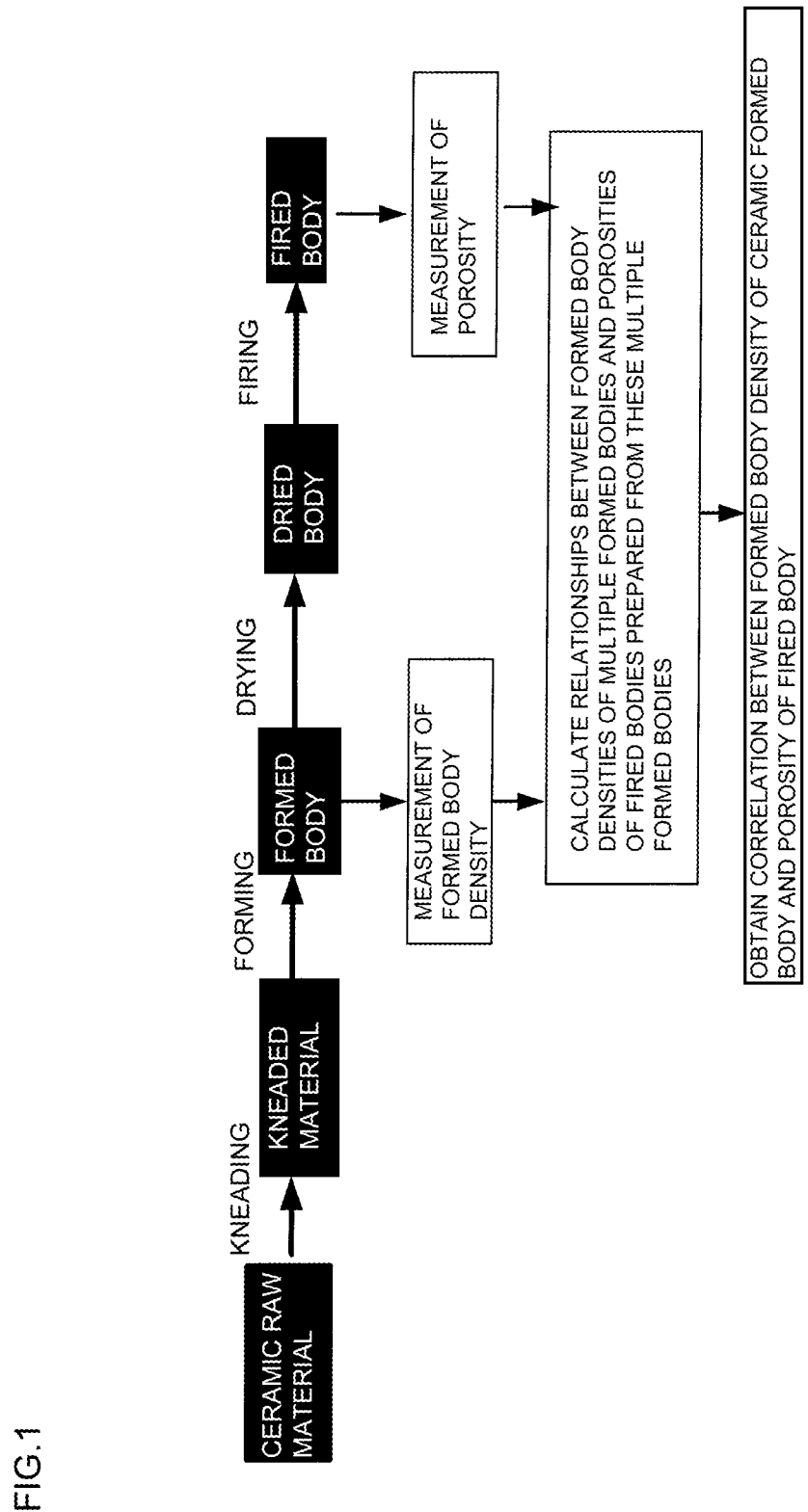
FIG. 1 is an explanatory diagram schematically showing a schematic configuration of a correlation calculating step of a method of predicting a formed body density according to the present invention.

1. Method of Predicting Formed Body Density of Ceramic Formed Body:

FIG. 1 shows a method of predicting a formed body density of a ceramic formed body according to an embodiment of the present invention. The method of predicting a formed body density is used for preparing a ceramic fired body having a desired porosity, and includes a correlation calculating step of obtaining a correlation between a formed body density of a formed body and a porosity of a fired body, and a formed body density predicting step of calculating a predicted value of the formed body density of the formed body corresponding to a desired porosity of the fired body using the correlation. In the correlation calculating step, first, a kneaded material is prepared by kneading a ceramic raw material containing inorganic powder, a binder, a pore former, and water, the kneaded material is formed to prepare a formed body, and a formed body density of the formed body is measured. Furthermore, the formed body is dried to prepare a dried body, the dried body is fired to prepare a fired body, and a porosity of the fired body is measured. Then, the correlation between the measured formed body density of the formed body and the measured porosity of the fired body is obtained. The formed body density predicting step is a step of calculating a predicted value of the formed body density of the formed body corresponding to the desired porosity of the fired body using the correlation. Specifically, in the formed body density predicting step, in a case where a kneaded material A is prepared from a ceramic raw material having substantially the same composition as the ceramic raw material used for preparing the kneaded material, the kneaded material A is formed to prepare a formed body B, the formed body B is dried to prepare a dried body C and further the dried body C is fired to prepare a fired body D having a desired porosity, a predicted value of the formed body density of the formed body B corresponding to the desired porosity of the fired body D is calculated using the obtained correlation.

(Correlation Calculating Step)

In the correlation calculating step of the present invention, as shown in FIG. 1, a kneaded material is prepared by kneading a ceramic raw material containing inorganic powder, a binder, a pore former, and water, the kneaded material is formed to prepare a formed body, a formed body density of the formed body is measured, and furthermore, the formed body is dried to prepare a dried body, the dried body is fired to prepare a fired body, and a porosity of the fired body is measured, thereby obtaining the correlation between the formed body density of the formed body and the porosity of the fired body. In this step, a plurality of kneaded materials is prepared, and the formed body density and the porosity of the fired body are measured for each of the kneaded materials.

Here, preparation of the ceramic formed body will be described. As shown in FIG. 1, to prepare a ceramic formed body, a kneaded material is first prepared from a ceramic raw material. The ceramic raw material referred to in the present specification is a raw material for preparing a kneaded material, and contains at least inorganic powder, a binder, a pore former, and water, and may appropriately contain other materials such as a surfactant.

Examples of the inorganic powder usable in the present invention include ceramic powder such as glass, alumina, silica, talc, kaolin, silicon nitride, silicon carbide, aluminum nitride, zirconia, and sialon. Also, a cordierite forming raw material, which is a substance to be converted into cordierite by firing, is also preferable. Examples of the cordierite forming raw material include a mixture obtained by mixing, for example, talc, kaolin, alumina, aluminum hydroxide, and silica such that the composition of the mixture after firing becomes the theoretical composition of cordierite ($2MgO \cdot 2Al_2O_3 \cdot 5SiO_2$). Incidentally, the ceramic raw material that can be used in the present invention may contain only one kind of the above-mentioned ceramic powder, or may contain two or more kinds thereof. Note that, for example, metallic silicon to be a constituent substance of a metallic silicon (Si)/silicon carbide (SiC) sintered body can also be used.

The binder is an additive that functions as a reinforcing agent that imparts fluidity to a kneaded material at the time of forming a ceramic formed body and maintains the mechanical strength of the ceramic formed body before firing (ceramic dried body). Examples of the binder that can be preferably used include hydroxypropyl methylcellulose, methylcellulose, hydroxyethyl cellulose, carboxyl methylcellulose, and polyvinyl alcohol.

The pore former is an additive for obtaining a porous honeycomb structure having a high porosity by increasing the porosity by burning out the ceramic formed body to form pores at the time of firing the ceramic formed body. Therefore, the pore former is preferably a combustible material that is burned out at the time of firing the ceramic formed body. As the pore former, those which are hardly soluble and/or those which are soluble in water and a binder in a kneaded material can be used. In the present invention, at least a part of the pore former is preferably soluble in water. Specific examples of the pore former include graphite, wheat flour, starch, phenol resin, polymethyl methacrylate, polyethylene, and polyethylene terephthalate. Among others, the pore former preferably includes a foamable resin to be destroyed by being kneaded with water. Incidentally, the foamable resin also has a property of being destroyed by application of pressure. A microcapsule made of a foamable resin can be particularly preferably used as the foamable resin. The microcapsule made of a foamable resin is hollow, and thus makes it possible to obtain a porous ceramic structure with a high porosity by adding a small amount of the resin. In addition, in the microcapsule, heat generation during firing is small and occurrence of cracks due to thermal stress can be reduced. As such a foamable resin, for example, Matsumoto Microsphere manufactured by Matsumoto Yushi-Seiyaku Co., Ltd. can be preferably used.

The surfactant is an additive for promoting the dispersion of an aggregate particle raw material or the like in water and obtaining a homogeneous forming compound. Therefore, as a dispersing agent, substances having a surface active effect, for example, ethylene glycol, dextrin, fatty acid soap, and polyalcohol can be preferably used.

The kneaded material referred to in the present specification is one which can be prepared by kneading the above-mentioned ceramic raw material, and also means one with which a ceramic product can be prepared by firing.

After preparation of the kneaded material, the kneaded material is formed into a desired shape to prepare a formed body. The method of forming the kneaded material is not particularly limited, but for example, extrusion, injection molding, or press molding can be used. It is preferable to prepare two or more formed bodies from one kneaded material. Among the prepared formed bodies, one of the formed bodies is used for measuring the formed body density and the other formed body is fired and used for measuring the porosity of the fired body.

Figure 5:
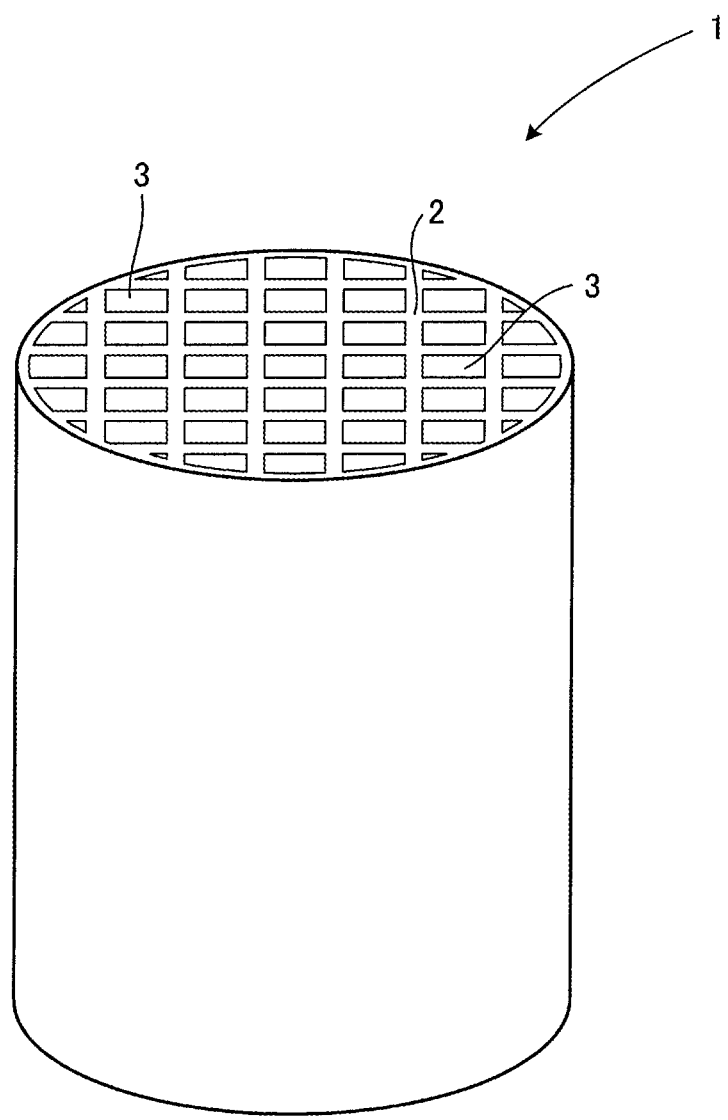
FIG. 5 is an explanatory view showing an example of a honeycomb formed body.

A method of measuring the formed body density will be described. Here, a measurement method in which a honeycomb formed body 1 is used as the ceramic formed body will be described. The honeycomb formed body 1 is a ceramic formed body having a "honeycomb shape". The "honeycomb shape" means, for example, a shape in which a large number of cells 3, which become through channel for fluid extending from a first end face to a second end face, are defined by partition walls 2, like the honeycomb formed body 1 shown in FIG. 5. The overall shape of the honeycomb formed body 1 is not particularly limited, and for example, may be a round pillar shape as shown in FIG. 5, or may be a shape such as a quadrangular prism shape and a triangular prism shape. The cell shape of the honeycomb formed body 1 (the cell shape in a cross section perpendicular to the formation direction of the cells 3) is not particularly limited, either. For example, the cell shape may be rectangular as shown in FIG. 5, or may be hexagonal or triangular.

As the method of measuring the formed body density of the honeycomb formed body 1, first, the honeycomb formed body 1 is formed into a desired shape (for example, a quadrangular prism obtained by cutting end faces of the honeycomb formed body 1 into a square shape of 150×150 mm), and then crushed to a certain extent in a direction parallel to the extending direction of the cells 3. As a result, a part of the cells 3 is crushed, and part of the air in the cells 3 of the honeycomb formed body 1 can be discharged.

Next, the somewhat crushed honeycomb formed body 1 is further crushed using, for example, a torque wrench. The set pressure of the torque wrench is preferably from 30 to 50 N·m. The set pressure is more preferably 40 N·m. By crushing the honeycomb formed body 1 at the set pressure of 30 to 50 N·m, the cells 3 can be completely crushed, and the air other than that contained in the pores of the partition walls 2 can be completely discharged. As a result, it is possible to accurately measure the formed body density to be measured later. In addition, the sample compression surface pressure is preferably 0.23 to 0.38 $kgf/cm^2$. The sample compression surface pressure is more preferably 0.3 $kgf/cm^2$.

The six surfaces of the crushed honeycomb formed body 1 are cut off with a wire, whereby the honeycomb faulted body 1 is formed into a rectangular parallelepiped block shape. It is preferable that all the surfaces of the rectangular parallelepiped be surfaces cut by the wire. The rectangular parallelepiped having a sample volume of about 125 $cm^3$ can be used. The weight in water and the weight in air of the cut rectangular parallelepiped formed body are measured using a hydrometer, thereby calculating a formed body density. The calculation may be automated calculation by a hydrometer. The method of measuring and calculating the formed body density is not limited to the above method, and any method can be applied as long as it is a method of measuring an accurate formed body density.

Next, the other formed body is dried to prepare a dried body, the dried body is fired to prepare a fired body, the porosity of the fired body is measured, and the correlation between the formed body density of the formed body and the porosity of the fired body is obtained. The method of drying the ceramic formed body is not particularly limited, but for example, a method of natural drying at room temperature (natural drying), a method of drying by applying hot air (hot air drying), a method of drying using high frequency energy (dielectric drying), or a method of drying using microwaves (microwave drying) can be used. The method of firing the dried body is not particularly limited, either, but there is a method of using a single kiln or a continuous furnace such as a tunnel furnace.

The method of measuring the porosity of the honeycomb fired body preferably includes measurement using a mercury porosimeter (mercury intrusion method).

In the present invention, as long as a kneaded material is prepared from ceramic raw materials having substantially the same composition, preparation of a plurality of kneaded materials and preparation of a plurality of fired bodies may be either performed at the same time or at different times. Also, measurement of the formed body density of the formed body and measurement of the porosity of the fired body may be either performed at the same time or at different times.

In a case where the pore former in the kneaded material contains a foamable resin which is destroyed by being kneaded with water, the amount of water in the kneaded material affects the porosity of the fired body obtained by drying and firing the formed body prepared from the kneaded material. The porosity rises when the amount of water added is large, while the porosity decreases when the amount of water added is small. Therefore, by adjusting the amount of water to be added, fired bodies having various porosities can be prepared.

Figure 2:
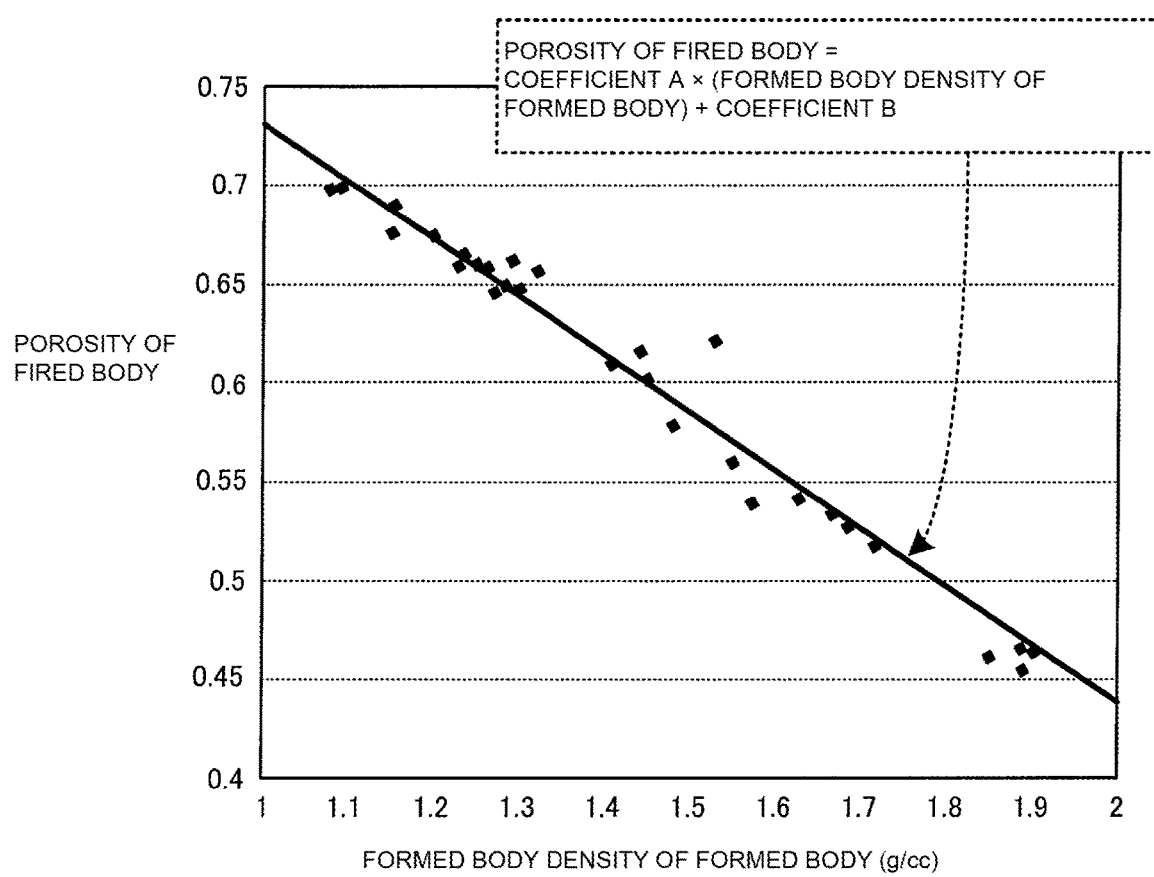
FIG. 2 is a diagram showing a correlation between a formed body density of a ceramic formed body and a porosity of a ceramic fired body.

There is a correlation between the formed body density and the porosity of the fired body. FIG. 2 is a diagram showing the relationship between the formed body density of the ceramic formed body and the porosity of the formed body after firing. Each of the multiple dispersed dots shown in the figure indicates a value of the formed body density of the individual kneaded material as well as a value of the porosity of the fired body prepared from the kneaded material. In addition, the data shown in this figure are of the kneaded material prepared from ceramic raw materials having the same composition except for the addition amount of water. From the data shown in FIG. 2, it can be confirmed that the porosity of the fired body tends to decrease as the formed body density increases.

According to the method of predicting a formed body density of the present invention, as shown in FIG. 2, this correlation is preferably obtained through approximation to a linear function [porosity of fired body=coefficient A×(formed body density)+coefficient B]. The linear function shown in FIG. 2 derives the coefficient A and the coefficient B using the least squares method.

The porosity adjustment margin of the present invention means a change in the porosity relative to the water content of the ceramic formed body. For example, in the correlation shown in FIG. 2, when the water content changes by 5%, the porosity changes by 8.8%. The porosity adjustment margin varies depending on, for example, the formulation of the ceramic raw material that becomes a kneaded material.

(Formed Body Density Predicting Step)

Furthermore, in a case where a kneaded material A is prepared from a ceramic raw material having substantially the same composition as the ceramic raw material used for preparing the kneaded material, the kneaded material A is formed to prepare a formed body B, the formed body B is dried to prepare a dried body C and further the dried body C is fired to prepare a fired body D having a desired porosity, the method of predicting a formed body density according to the present invention includes a formed body density predicting step of calculating a predicted value of the formed body density of the formed body B corresponding to the desired porosity of the fired body D using the correlation.

Figure 3:
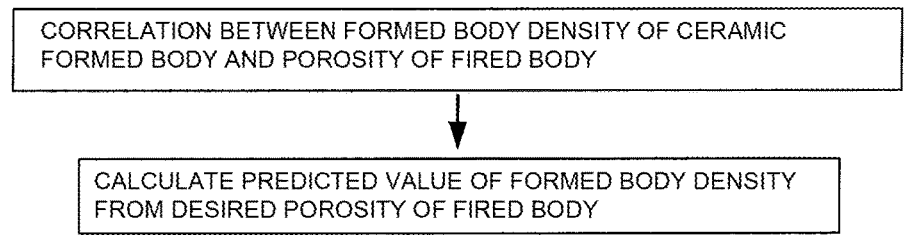
FIG. 3 is an explanatory diagram schematically showing a schematic configuration of a formed body density predicting step of the method of predicting a formed body density according to the present invention.

FIG. 3 shows a flowchart of the formed body density predicting step. As shown in the figure, when the correlation between the formed body density and the porosity of the fired body is determined, in a case where a porosity value of another fired body D to be prepared is predetermined, an appropriate value of the formed body density can be predicted from this porosity value based on the correlation. For example, in a case of using a ceramic raw material having substantially the same composition as that of the data shown in FIG. 2, it is possible to predict an appropriate value of the formed body density of the formed body B by applying the predetermined porosity value of the fired body D to the linear function [porosity of fired body=coefficient A×(formed body density)+coefficient B] in FIG. 2.

Figure 4:
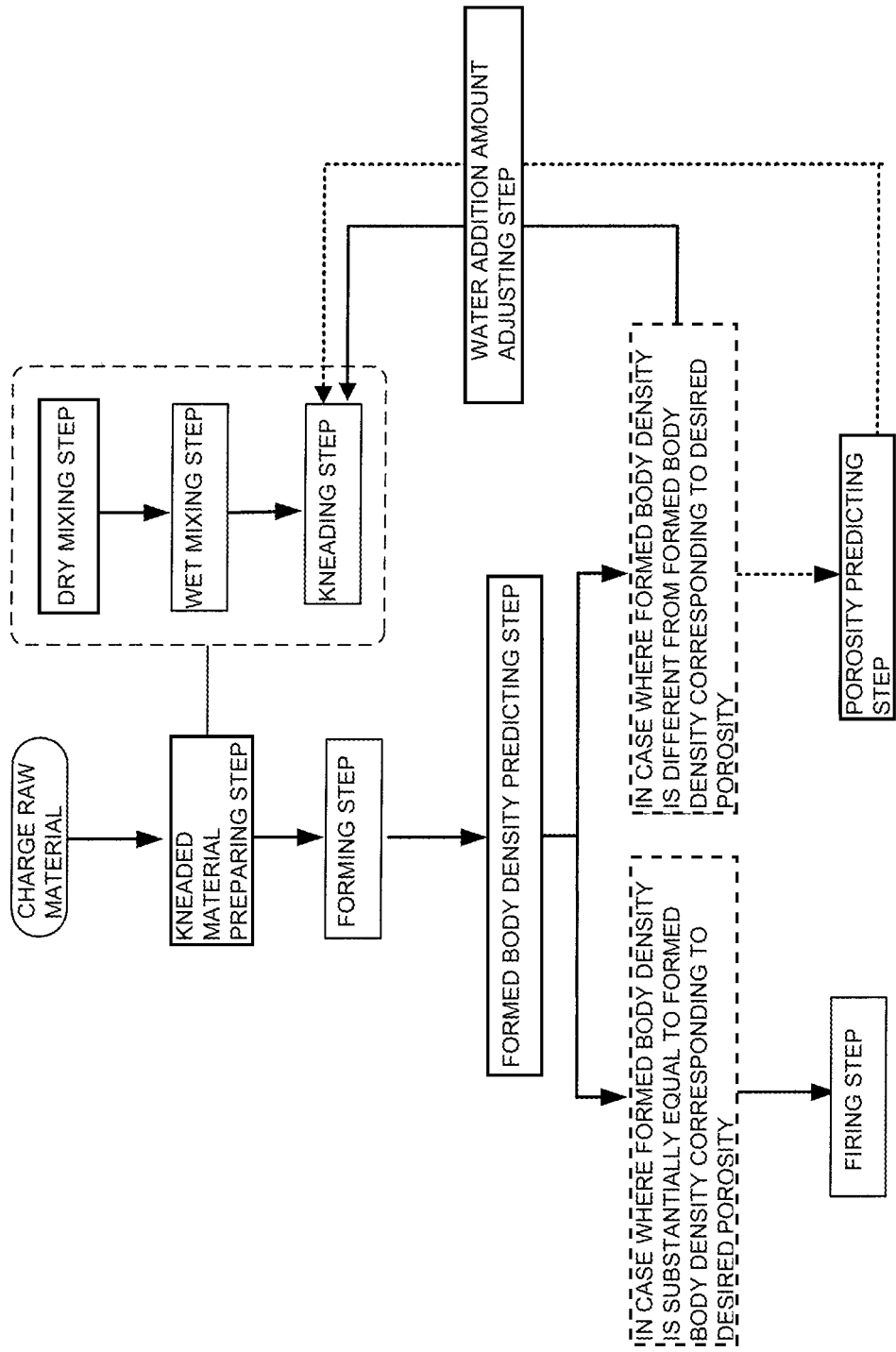
FIG. 4 is an explanatory diagram schematically showing a schematic configuration of a method of manufacturing a ceramic fired body according to the present invention.

2. Method of Manufacturing Ceramic Fired Body:

Next, a method of manufacturing a ceramic fired body using the above-mentioned method of predicting a formed body density will be described. FIG. 4 is a diagram showing a schematic configuration of the method of manufacturing a ceramic fired body according to the present invention. In the method of manufacturing a ceramic fired body, a fired body D having a desired porosity is prepared from a kneaded material A using the method of predicting a formed body density. Specifically, the method includes a kneaded material preparing step of preparing the kneaded material A by kneading a ceramic raw material containing inorganic powder, a binder, a pore former, and water, a forming step of forming a formed body B by extruding the kneaded material A, and a firing step of preparing the fired body D by firing the formed body B. The method further includes a water addition amount adjusting step of adjusting the amount of water contained in the kneaded material A so as to obtain a predicted value of the formed body density of the formed body B.

As shown in FIG. 4, in the method of manufacturing a ceramic fired body of the present invention, in order to manufacture a honeycomb fired body having a predetermined porosity, it is preferable to measure the formed body density of the formed body B after the kneaded material preparing step of preparing the kneaded material A by kneading a ceramic raw material containing inorganic powder, a binder, a pore former, and water and the forming step of forming the formed body B by extruding the kneaded material A. Note that it is preferable to predict, from the predetermined porosity, a value of the formed body density corresponding to the porosity based on the above-mentioned method of predicting a formed body density. After that, it is preferable to check whether the measured value of the formed body density of the formed body B is substantially equal to the formed body density predicted based on the correlation described above. In a case where the value of the formed body density of the formed body B is substantially equal to the predicted value of the formed body density, the kneaded material A can be extruded as it is to form the formed body B, which can then be fired to prepare the fired body D. On the other hand, in a case where the value of the formed body density of the formed body B is different from the predicted value of the formed body density, the water addition amount adjusting step is performed.

In the water addition amount adjusting step, it is preferable to adjust the water addition amount by adding water to the kneaded material A being kneaded. In a case where the pore former in the kneaded material contains a foamable resin which is destroyed by being kneaded with water, the amount of water in the kneaded material affects the porosity of the fired body obtained by drying and firing the formed body prepared from the kneaded material. The porosity rises when the amount of water added is large, while the porosity decreases when the amount of water added is small. Therefore, by adjusting the water addition amount through the water addition amount adjusting step, it is possible to prepare a formed body having a desired porosity after firing. The water addition amount adjusting step of the present invention can be used only in a case where the measured value of the formed body density of the formed body B is higher than the predicted value of the formed body density.

Next to the water addition amount adjusting step, the kneaded material A to which water has been added and which has been kneaded (referred to as a kneaded material A1) is formed to obtain a formed body (referred to as a formed body B1). Then, it is preferable to measure the formed body density of the formed body B1. If the measured value of the formed body density of the formed body B1 is substantially equal to the predicted value of the formed body density, the kneaded material A1 can be formed and fired as it is to obtain a fired body D1 having a desired porosity value. On the other hand, in a case where the measured value of the formed body density of the formed body B1 is different from the predicted value of the formed body density, it is preferable to perform the water addition amount adjusting step again, to form the kneaded material A1 to which water has been added and which has been kneaded (kneaded material A2), and to measure the formed body density. It is preferable to repeat the water addition amount adjusting step, the forming step, and the measurement of the formed body density until the measured value of the formed body density becomes substantially equal to the predicted value of the formed body density as described above. When the measured value of the formed body density becomes substantially equal to the predicted value of the formed body density, the kneaded material at that time can be formed and fired to prepare a fired body having a desired porosity.

The method of manufacturing a ceramic fired body of the present invention preferably further includes a formed body density measuring step of measuring the formed body density of the formed body B, and a porosity predicting step of predicting the porosity of the fired body D using the formed body density measured in the formed body density measuring step based on the correlation. In a case where the porosity predicted in the porosity predicting step is different from the desired porosity, it is preferable to adjust the amount of water in the water addition amount adjusting step. The porosity of the fired body can be predicted by applying the measured formed body density to the linear function [porosity of fired body=coefficient A×(formed body density)+coefficient B]. In a case where the porosity of the fired body is different from the desired porosity, the predicted value of the porosity can be made substantially equal to the desired porosity by performing the above-described water addition amount adjusting step. By forming and firing the kneaded material A of the formed body corresponding to the predicted value of the porosity which has become substantially equal to the desired porosity, the fired body D having the desired porosity can be manufactured.

Note that the outline of the kneaded material preparing step is shown in the frames surrounded by the broken lines in FIG. 4. The kneaded material preparing step preferably includes a dry mixing step of performing dry mixing, through batch treatment, on a raw material including inorganic powder, a binder, and a pore former among the ceramic raw material, a wet mixing step of performing wet mixing on the dry mixture obtained in the dry mixing step by adding liquid containing water to the dry mixture, and a kneading step of kneading the wet mixture obtained in the wet mixing step. In the water addition amount adjusting step of the present invention, it is preferable to adjust the water addition amount by adding water to the kneaded material in the process of kneading the wet mixture in the kneading step. The adjustment by adding water during the kneading step makes it possible to adjust the formed body density without stopping the forming equipment. In addition, as a method of adding water, it is preferable to attach a liquid injection pump to the kneading apparatus so that water can be continuously added. The kneaded material preparing step will be described below.

(Kneaded Material Preparing Step)

It is preferable that the kneaded material preparing step be carried out using a ceramic formed body manufacturing apparatus having a configuration capable of performing each of the dry mixing step, the wet mixing step, and the kneading step. In addition, preferably, the ceramic formed body manufacturing apparatus mainly includes, as functional configurations thereof, a batch type dry mixing unit, a batch type or continuous type wet mixing unit, a kneading unit, and an extrusion unit. The kneading unit preferably has a function of further adding water to a constituent element thereof. In addition, the ceramic formed body manufacturing apparatus preferably has a function of adjusting the amount of water to be added in the kneading unit. The flow of the kneaded material preparing step will be described below.

(Dry Mixing Step)

The dry mixing step is preferably carried out using the batch type dry mixing unit (batch mixer). A raw material containing a plurality of kinds of powdered or powdery ceramic powder, a pore former, and a binder measured at a predetermined blending ratio is charged into the dry mixing unit, and agitated and mixed by an agitating mechanism (not shown) such that the ceramic powder, the pore former, and the binder are uniformly mixed with one another. As a result, the raw material is converted into a dry mixture in which the multiple kinds of ceramic powder and the like have been uniformly dispersed.

(Wet Mixing Step)

The resultant dry mixture is preferably sent to the wet mixing step. Here, the wet mixing step is preferably carried out using a batch type or continuous type wet mixing unit (batch mixer or continuous mixer) that performs wet mixing of the dry mixture by batch treatment or continuous treatment. In the case of using the batch type wet mixing unit, it is possible to use the dry mixing unit that has performed the dry mixing as it is, and after charging liquid in a specified addition amount, the dry mixture and the liquid are mixed using the above agitating mechanism.

On the other hand, in the case of using the continuous type wet mixing unit, it is preferable that the dry mixture mixed by the dry mixing unit be gradually charged into the wet mixing unit at a predetermined charging rate, and that liquid be charged at the same time and mixed with the dry mixture through wet mixing by means of the agitating mechanism. As a result, the dry mixture and the liquid are uniformly dispersed and mixed, and converted into a wet mixture.

(Kneading Step)

Thereafter, the kneading step is preferably carried out using a kneader. In the manufacturing method of the present embodiment, it is preferable that the kneading step and the subsequent forming step be carried out continuously and seamlessly. That is, in the ceramic formed body manufacturing apparatus, the kneading unit kneads the wet mixture sent from the wet mixing unit, and furthermore, the treated kneaded product (forming raw material) is directly sent to the extrusion unit that is formed continuously and monolithically with the kneading unit. Then, the forming raw material is extruded through the extrusion die (die) of the extrusion unit. As a result, a ceramic formed body is formed.

In the kneading step, the binder swollen in the wet mixing step has an affinity for the ceramic powder. As a result, the surface of the ceramic powder is coated with the swollen binder. Consequently, the wet mixture is converted into a kneaded product. The kneaded product thus obtained is subjected to deaerating treatment in which air contained in the kneaded product is sucked and deaerated using a vacuum suction device in the kneading unit. Furthermore, compressing and densifying treatment is carried out in which a predetermined load is added to the kneaded product to thereby compress and densify the kneaded product. As a result, a forming raw material as a uniform continuous body is obtained in such a manner that the ceramic powder, the pore former, and the binder that are charged into the extrusion unit are uniformly mixed and densified.

In the case of using the continuous type wet mixing unit, the treatment up to the extrusion unit through the kneading unit can be carried out continuously and seamlessly. Therefore, it is possible to form the ceramic formed body more efficiently and stably. Note that even in the case of using the batch type wet mixing unit, a sufficient effect of the manufacturing method of the present invention can be obtained.

EXAMPLES

Hereinafter, the present invention will be described in more detail based on Examples, but the present invention is not limited to these Examples.

Example 1

Samples 1 to 3 were prepared. First, 25 kg of an organic binder, 25 kg of a pore former (Matsumoto Microsphere, manufactured by Matsumoto Yushi-Seiyaku Co., Ltd.), and water in amounts of 148 kg, 162 kg, and 162 kg, respectively were added to 500 kg of inorganic powder [average particle size (arithmetic mean diameter): 200 μm] obtained by blending alumina, kaolin, talc, and silica in a composition that becomes a cordierite composition after firing, whereby kneaded materials were prepared. The water contents of moistened powder in the kneaded materials of Samples 1 to 3 at the batch mixer were 22.8%, 22.0%, and 20.0%, respectively.

For the kneaded materials of Samples 1 to 3, 0%, 1%, and 2% of water were further added to the kneader, respectively, and the kneaded materials were further kneaded. As a result, the water contents of the kneaded materials after kneading were 22.8%, 23.0%, and 23.0%, respectively.

Subsequently, the kneaded material was subjected to vacuum deaeration and then extruded through a die, whereby a honeycomb formed body 1 having an outer diameter of 100.0 mm and a length of 100 min was prepared. Two honeycomb formed bodies 1 were prepared from one kneaded material. The formed body density was measured using one of the formed bodies, and the other formed body was further dried to prepare a honeycomb dried body, which was then fired to prepare a honeycomb fired body.

In measurement of the formed body density of the honeycomb formed body 1, first, the honeycomb formed body 1 was crushed to a certain extent in a direction parallel to the extending direction of cells 3, and the somewhat crushed honeycomb formed body 1 was further crushed using, for example, a torque wrench at a set pressure of 40 N·m. The six surfaces of the crushed honeycomb formed body 1 were cut off with a wire, whereby the honeycomb formed body 1 was formed into a rectangular parallelepiped block shape of 5 cm×5 cm×5 cm. The weight in water and the weight in air of the cut rectangular parallelepiped formed body were measured using a hydrometer, thereby calculating the formed body density. The formed body densities are shown in Table 1.

The porosity of the honeycomb fired body was measured by a mercury porosimeter (AutoPoreIV 9505 manufactured by Micromeritics). The porosities of the fired bodies are shown in Table 1.

TABLE 1

|  | Sample 1 | Sample 2 | Sample 3 |
| --- | --- | --- | --- |
| Water content of moistened powder at batch mixer (%) | 22.8 | 22.0 | 20.0 |
| Amount of water added to kneader (%) | 0 | 1 | 2 |
| Water content before forming honeycomb formed body (%) | 22.8 | 23.0 | 23.0 |
| Formed body density (g/cc) | 1.48 | 1.40 | 1.37 |
| Porosity of fired body (%) | 59.1 | 61.4 | 62.3 |

It is found from Table 1 that, in the honeycomb formed bodies 1 each having substantially equal water contents after water is added to the kneaded materials becoming the honeycomb formed bodies 1, the formed body densities thereof and the porosities after firing are each substantially equal.

The method of predicting a formed body density and the method of manufacturing a ceramic fired body of the present invention can be used for manufacturing a ceramic fired body that is applicable to, for example, a catalyst carrier for purifying automobile exhaust gas, a diesel particulate removal filter, or a heat storage body for a combustion device.

DESCRIPTION OF REFERENCE NUMERALS

1: honeycomb formed body, 2: partition wall, 3: cell.

What is claimed is:

1. A method of manufacturing a ceramic fired body, comprising:
   a correlation calculating step including:
      preparing a kneaded material by kneading a ceramic raw material containing inorganic powder, a binder, a pore former, and water, wherein the pore former contains a foamable resin that is destroyed by being kneaded with the water;

preparing a formed body by forming the kneaded material;

measuring a formed body density of the formed body;

further preparing a dried body by drying the formed body;

preparing a fired body by firing the dried body;

measuring a porosity of the fired body; and obtaining a correlation between the formed body density of the formed body and the porosity of the fired body; and a formed body density predicting step including:

in a case of preparing a kneaded material A from a ceramic raw material having substantially the same composition as the ceramic raw material used for preparing the kneaded material, preparing a formed body B by forming the kneaded material A, preparing a dried body C by drying the formed body B, and further preparing a fired body D having a desired porosity by firing the dried body C, calculating a predicted value of the formed body density of the formed body B corresponding to the desired porosity of the fired body D using the correlation, and the method further comprising:

a kneaded material preparing step of preparing the kneaded material A by kneading a ceramic raw material containing inorganic powder, a binder, a pore former and water, the pore former containing a foamable resin that is destroyed by being kneaded with the water;

a forming step of forming the formed body B by extruding the kneaded material A;

a firing step of preparing the fired body D by firing the formed body B; and after the forming step of forming the formed body B, (i) if a measured value of the formed body density of the formed body B formed by the forming step is equal to the predicted value of the formed body density, the firing step of preparing the fired body D by firing the formed body B is performed, or (ii) if the measured value of the formed body density of the formed body B is different from the predicted value of the formed body density, a water addition amount adjusting step of adjusting an amount of water contained in the kneaded material A in order to obtain the predicted value of the formed body density of the formed body B is performed and repeated from the kneading step until the predicted value of the formed body density of the formed body B is obtained, after the water addition amount adjusting step.

2. The method of manufacturing a ceramic fired body according to claim 1, wherein the correlation is obtained by approximating the correlation to a linear function [porosity of fired body=coefficient A×(formed body density)+coefficient B].

3. The method of manufacturing a ceramic fired body according to claim 1, further comprising:

a porosity predicting step of predicting the porosity of a second fired body D based on the correlation, using the measured formed body density, wherein the amount of water is adjusted in the water addition amount adjusting step to obtain the porosity predicted in the porosity predicting step.

4. The method of manufacturing a ceramic fired body according to claim 1, wherein the kneaded material preparing step includes:

a dry mixing step of performing dry mixing, through batch treatment, on a raw material including the inorganic powder, the binder, and the pore former among the ceramic raw material;

a wet mixing step of performing wet mixing on a dry mixture obtained in the dry mixing step by adding liquid containing the water to the dry mixture; and a kneading step of kneading a wet mixture obtained in the wet mixing step, and the water addition amount adjusting step includes adjusting a water addition amount by adding the water to the kneaded material A in a process of kneading the wet mixture in the kneading step.

* * * * *